US010225797B2

(12) United States Patent
Lightstone et al.

(10) Patent No.: US 10,225,797 B2
(45) Date of Patent: Mar. 5, 2019

(54) PASSIVE PROXIMITY DETECTION OF WIRELESS DEVICES IN A SYNCHRONOUS, COOPERATIVE NETWORK

(71) Applicant: Telefonaktiebolaget LM Ericsson (publ), Stockholm (SE)

(72) Inventors: Leonard Lightstone, Ottawa (CA); Christopher Richards, Ottawa (CA); Edward Mah, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 103 days.

(21) Appl. No.: 15/301,575

(22) PCT Filed: Apr. 3, 2014

(86) PCT No.: PCT/IB2014/060409
§ 371 (c)(1),
(2) Date: Oct. 3, 2016

(87) PCT Pub. No.: WO2015/150874
PCT Pub. Date: Oct. 8, 2015

(65) Prior Publication Data
US 2017/0111857 A1    Apr. 20, 2017

(51) Int. Cl.
*H04W 52/02* (2009.01)
*H04W 76/27* (2018.01)
(Continued)

(52) U.S. Cl.
CPC ........... *H04W 52/0206* (2013.01); *G01S 5/02* (2013.01); *G01S 5/0205* (2013.01); *G01S 11/06* (2013.01);
(Continued)

(58) Field of Classification Search
CPC ............ H04W 52/0206; H04W 4/023; H04W 74/0833; H04L 5/0048; G01S 11/06
(Continued)

(56) References Cited

U.S. PATENT DOCUMENTS 9,408,095 B2   8/2016 Lightstone et al.
2010/0087208 A1   4/2010 Lister
(Continued)

FOREIGN PATENT DOCUMENTS

EP    2584843 A1    4/2013

OTHER PUBLICATIONS

Author Unknown, "Technical Specification Group Radio Access Network; Evolved Universal Terrestrial Radio Access (E-UTRA); Potential solutions for energy saving for E-UTRAN (Release 11)," Technical Report 36.927, Version 11.0.0, 3GPP Organizational Partners, Sep. 2012, 22 pages.
(Continued)

*Primary Examiner* — Kamran Afshar
*Assistant Examiner* — Farid Seyedvosoghi
(74) *Attorney, Agent, or Firm* — Patent Portfolio Builders, PLLC

(57) ABSTRACT

Systems and methods for passive proximity detection of wireless devices in a cellular communications network are disclosed. In one embodiment, a supporting radio access node in a cellular communications network including one or more coverage radio access nodes in a coverage layer and one or more supporting radio access nodes in a supporting layer is disclosed. In this embodiment, the supporting radio access node detects a ranging signal transmitted by a wireless device while passively listening for a ranging signal. The supporting radio access node receives ranging assistance information from an anchor radio access node of the wireless device in the coverage layer and determines a range
(Continued)

estimate for a range between the wireless device and the supporting radio access node based on the ranging signal transmitted by the wireless device and detected by the supporting radio access node and the ranging assistance information.

21 Claims, 13 Drawing Sheets

(51) Int. Cl.
  *G01S 5/02* (2010.01)
  *G01S 11/06* (2006.01)
  *H04L 5/00* (2006.01)
  *H04W 4/02* (2018.01)
  *H04W 74/08* (2009.01)
  *H04W 84/04* (2009.01)
  *H04W 64/00* (2009.01)

(52) U.S. Cl.
  CPC ........... *H04L 5/0048* (2013.01); *H04W 4/023* (2013.01); *H04W 74/0833* (2013.01); *H04W 76/27* (2018.02); *H04W 64/00* (2013.01); *H04W 84/045* (2013.01); *Y02D 70/00* (2018.01); *Y02D 70/1262* (2018.01); *Y02D 70/1264* (2018.01)

(58) Field of Classification Search
  USPC ...................................................... 455/456.1
  See application file for complete search history.

(56) References Cited

U.S. PATENT DOCUMENTS

| | | | |
|---|---|---|---|
| 2011/0026419 A1* | 2/2011 | Kim | H04W 52/281 370/252 |
| 2012/0129550 A1* | 5/2012 | Hannan | G01S 5/0036 455/456.1 |
| 2013/0279430 A1* | 10/2013 | Damnjanovic | H04W 8/22 370/329 |
| 2013/0310048 A1 | 11/2013 | Hunukumbure et al. | |
| 2014/0120893 A1* | 5/2014 | Malladi | H04W 52/0206 455/418 |
| 2015/0223084 A1 | 8/2015 | Lightstone et al. | |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.1.0, 3GPP Organizational Partners, Mar. 2014, 209 pages.

Author Unknown, "Technical Specification Group Radio Access Network; Evolved Universal Terrestrial Radio Access Network (E-UTRAN); X2 application protocol (X2AP) (Release 12)," Technical Specification 36.423, Version 12.3.0, 3GPP Organizational Partners, Sep. 2014, 153 pages.

Mitsubishi Electric, "R3-081949: Dynamic Setup of HNBs for Energy Savings and Interference Reduction," 3rd Generation Partnership Project (3GPP), TSG RAN WG3 Meeting #61, Aug. 18-22, 2008, 7 pages, Jeju Island, Korea.

International Search Report and Written Opinion for International Patent Application No. PCT/IB2014/060409, dated Nov. 25, 2014, 11 pages.

* cited by examiner

PASSIVE PROXIMITY DETECTION OF WIRELESS DEVICES IN A SYNCHRONOUS, COOPERATIVE NETWORK

This application is a 35 U.S.C. § 371 national phase filing of International Application No. PCT/IB2014/060409, filed Apr. 3, 2014, the disclosure of which is incorporated herein by reference in its entirety.

FIELD OF THE DISCLOSURE

The present disclosure relates to passive proximity detection of wireless devices in a cellular communications network.

BACKGROUND

Reduction of energy consumption by cellular networks is an important aspect of network evolution both in the context of the "greening" of technology and the significant potential for Operational Expenditures (OPEX) savings. Further, as cellular networks proliferate and increase their nodal density throughout the world, the importance of energy savings becomes compounded.

In addition to the "greening" of technology and OPEX savings, reduced energy consumption may create opportunities for new deployment scenarios. For example, reduced energy consumption may create an opportunity for solar-powered base stations with reasonably sized solar panels in areas with no access to the electrical grid, which is of particular interest for the further spread of mobile broadband services in rural areas, especially in the developing world. Furthermore, on power failure, energy efficiency at a base station (e.g., an enhanced Node B (eNB)) will maximize the base station operating time on power backup.

The collection of base stations in a Radio Access Network (RAN) is one of the largest, if not the largest, consumer of energy in the RAN. The energy requirements of the base stations vary considerably with time of day, day of week, geographic location, etc. A large portion of base stations will experience a low number of connected users and low capacity demand over a significant portion of their service life. Tailoring the energy consumption of the base stations in the RAN to the time dependent capacity demands on the RAN impacts multiple aspects of any approach to energy efficiency from a systems perspective.

The energy consumed by a base station will vary based on the activity of that base station. In particular, the action of transmitting Radio Frequency (RF) energy requires a disproportionately large amount of total energy consumed by the base station, particularly in macro and micro type base stations. Furthermore, owing to the advances in energy efficient processor design, the energy consumed by the processors themselves depends strongly on load. As such, there is a significant energy benefit to keeping any processing load to a minimum.

In a heterogeneous network, there may be many base stations (e.g., pico base stations serving corresponding pico cells) that provide supplemental capacity for the cellular network but do not increase the coverage of the cellular network. More specifically, using a 3$^{rd}$ Generation Partnership Project (3GPP) Long Term Evolution (LTE) network as an example, the LTE network may include numerous macro eNBs that provide ubiquitous coverage for a desired geographic area and numerous small cell base stations (e.g., pico base stations serving pico cells) that provide supplemental capacity for the cellular network (e.g., hotspots). The eNBs that provide ubiquitous coverage are referred to herein as a coverage eNB layer or simply a coverage layer, whereas the eNBs that provide supplemental capacity are referred to herein as a supporting eNB layer or simply a supporting layer. During times of low demand, some or all of the eNBs in the supporting layer can be turned off or put into a low energy state in order to reduce the energy consumed by the cellular network.

Once the eNBs in the supporting layer are turned off or put into a low energy state, one issue that arises is deciding when the eNBs in the supporting layer should turn back on or transition to an active state. A number of approaches to controlling the operation of eNBs in the supporting layer are outlined in "Technical Specification Group Radio Access Network; Evolved Universal Terrestrial Radio Access (E-UTRA); Potential solutions for energy saving for E-UTRAN (Release 11)," 3GPP TR 36.927 V11.0.0, September 2012. Specifically, 3GPP TR 36.927 proposes four approaches. In the first approach, referred to as an "OAM predefined low-load periods policy," a coverage cell uses a proprietary algorithm that relies on predefined low load periods for each neighbor hotspot cell to decide which hotspot cells should be activated when the coverage cell detects high load. In a second approach, referred to as an "IoT measurement" approach, the coverage cell requests some dormant hotspot cells to switch on their listening capacity to perform and report Interference over Thermal (IoT) measurements when the coverage cell detects high load. In a third approach, referred to as a "UE measurement" approach, the coverage cell requests some dormant hotspot cells to transmit pilot signals for at least a short amount of time when the coverage cell detects high load. The User Equipment devices (UEs) covered by the coverage cell are configured to perform measurements on the pilot signals and send corresponding feedback to the coverage cell. Based on the measurements, the coverage cell determines which hotspot cells should be switched on. In a fourth approach, referred to as a "Positioning information" approach, the coverage cell uses a combination of UE locations, cell locations, and cell radii/transmit powers to decide which hotspots should be switched on when the coverage cell detects high load.

Each of the approaches described in 3GPP TR 36.927 has limitations. The Operations, Administration, Maintenance (OAM) based approach is coarse and does not dynamically adapt to the short term fluctuations in load. The UE measurement approach requires dormant cells to activate in a hunt and guess type of approach. The Positioning information approach requires relatively accurate position information for UEs in the vicinity. The IoT approach has the advantage of being based on passive sensing and is capable of responding to the dynamic changes in the environment. However, the IoT only provides a gross indication of uplink activity and does not provide a strong localization assessment. As well, as described in 3GPP TR 36.927, there is no opportunity for joint decision making between eNBs based on their IoT observations.

In light of the discussion above, there is a need for improved systems and methods for autonomously activating or waking base stations (e.g., eNBs) in a supporting layer of a RAN.

SUMMARY

Systems and methods for passive proximity detection of wireless devices in a cellular communications network are disclosed. In one embodiment, a method of operation of a supporting radio access node in a cellular communications network including one or more coverage radio access nodes in a coverage layer and one or more supporting radio access nodes in a supporting layer is disclosed. In this embodiment, the method of operation of the supporting radio access node includes detecting a ranging signal transmitted by a wireless device while passively listening for a ranging signal. The method further includes receiving ranging assistance information from an anchor radio access node of the wireless device in the coverage layer and determining a range estimate for a range between the wireless device and the supporting radio access node based on the ranging signal transmitted by the wireless device and detected by the supporting radio access node while passively listening for a ranging signal and the ranging assistance information.

In one embodiment, the supporting radio access node passively listens for a ranging signal when operating in a light sleep state. Further, in one embodiment, the method further includes determining whether to enter an active state based on the range estimate for the range between the wireless device and the supporting radio access node. Still further, in one embodiment, the method further includes deciding to enter the active state and, in response, entering the active state. In one embodiment, the active state is a dynamically active state, and the method further includes, after entering the dynamically active state, autonomously deciding to transition back to the light sleep state in which the supporting radio access node passively listens for a ranging signal.

In one embodiment, the cellular communications network is a synchronous network. In one embodiment, the ranging assistance information includes a range estimate for a range between the wireless device that transmitted the ranging signal and the anchor radio access node. In another embodiment, the ranging assistance information comprises fully or partially processed data received from the anchor radio access node. Further, in one embodiment, the method of operation of the supporting radio access node further includes receiving additional information from the anchor radio access node and deciding whether to enter an active state based on the range estimate and the additional information.

In one embodiment, the ranging signal is a Random Access Channel (RACH) transmission. In another embodiment, the ranging signal is an Uplink Sounding Reference Signal (UL SRS).

In one embodiment, a supporting radio access node is provided. In one embodiment, the supporting radio access node includes a transceiver, a processor, and memory containing instructions that are executable by the processor whereby the supporting radio access node is operative to detect a ranging signal transmitted by a wireless device while passively listening for a ranging signal, receiving ranging assistance information from an anchor radio access node of the wireless device in the coverage layer, and determine a range estimate for a range between the wireless device and the supporting radio access node based on the ranging signal transmitted by the wireless device and detected by the supporting radio access node and the ranging assistance information.

In another embodiment, the supporting radio access node is adapted to detect a ranging signal transmitted by a wireless device while passively listening for a ranging signal and determine a range estimate for a range between the wireless device and the supporting radio access node based on the ranging signal transmitted by the wireless device and detected by the supporting radio access node.

In another embodiment, the supporting radio access node includes a passive range estimation module operative to detect a ranging signal transmitted by a wireless device while passively listening for a ranging signal, receive ranging assistance information from an anchor radio access node of the wireless device in the coverage layer, and determine a range estimate for a range between the wireless device and the supporting radio access node based on the ranging signal transmitted by the wireless device and detected by the supporting radio access node and the ranging assistance information. In one embodiment, the supporting radio access node further includes a state selection module operative to decide whether to enter an active state based on the range estimate.

In one embodiment, a method of operation of a coverage radio access node in a cellular communications network including one or more coverage radio access nodes in a coverage layer and one or more supporting radio access nodes in a supporting layer is provided. In one embodiment, the method of operation of the coverage radio access node includes receiving a ranging signal from a wireless device, determining a range estimate for a range from the wireless device to the coverage radio access node based on the ranging signal received from the wireless device, and sending the range estimate to one or more of the supporting radio access nodes.

In one embodiment, the method of operation of the coverage radio access node further includes identifying one or more of the supporting radio access nodes that have coverage areas in which the wireless device is potentially located. In this embodiment, sending the range estimate to the one or more supporting radio access nodes includes sending the range estimate to the one or more of the supporting radio access nodes that have coverage areas in which the wireless device is potentially located.

In one embodiment, the method of operation of the coverage radio access node further includes sending additional information related to the range estimate to the one or more of the supporting radio access nodes.

In one embodiment, a coverage radio access node is provided. In one embodiment, the coverage radio access node includes a transceiver, a processor, and memory containing instructions that are executable by the processor whereby the coverage radio access node is operative to receive, via the transceiver, a ranging signal from a wireless device, determine a range estimate for a range from the wireless device to the coverage radio access node based on the ranging signal received from the wireless device, and send the range estimate to one or more of the plurality of supporting radio access nodes.

In another embodiment, the coverage radio access node is adapted to receive a ranging signal from a wireless device, determine a range estimate for a range from the wireless device to the coverage radio access node based on the ranging signal received from the wireless device, and send the range estimate to one or more of the plurality of supporting radio access nodes.

In another embodiment, the coverage radio access node includes a ranging signal reception module operative to receive a ranging signal from a wireless device, a range estimation module operative to determine a range estimate for a range from the wireless device to the coverage radio access node based on the ranging signal received from the wireless device, and a communication module operative to send the range estimate to one or more of the plurality of supporting radio access nodes.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
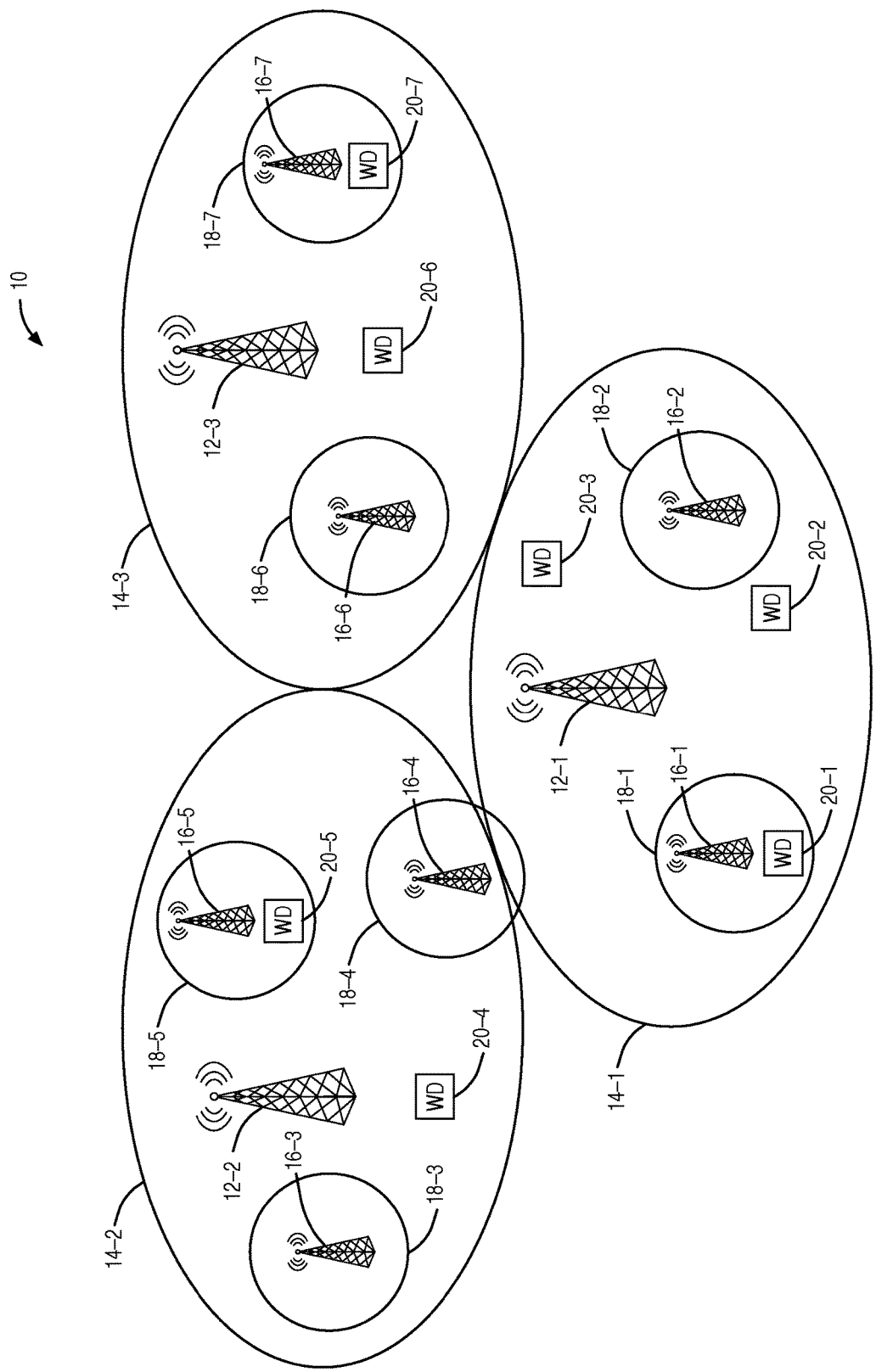
FIG. 1 illustrates a cellular network including a coverage layer and a supporting layer in which base stations in the supporting layer passively detect proximity of wireless devices and, in response, autonomously decide to activate according to one embodiment of the present disclosure.
Figure 3:
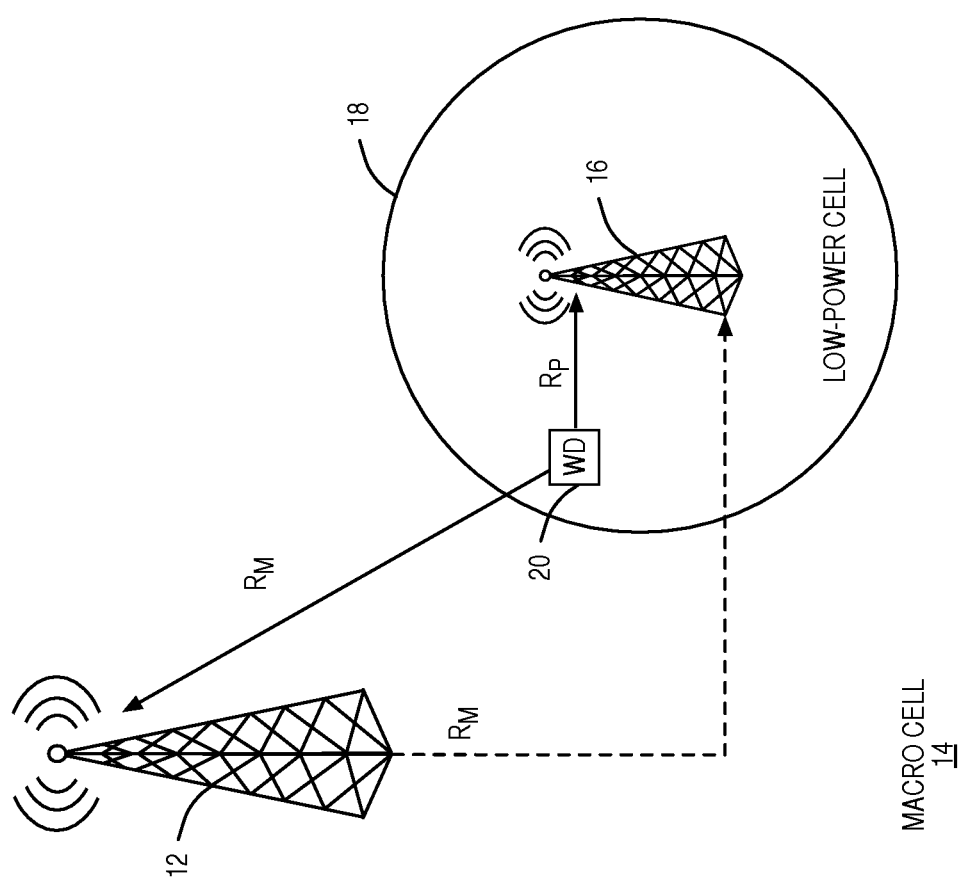
Figure 4:
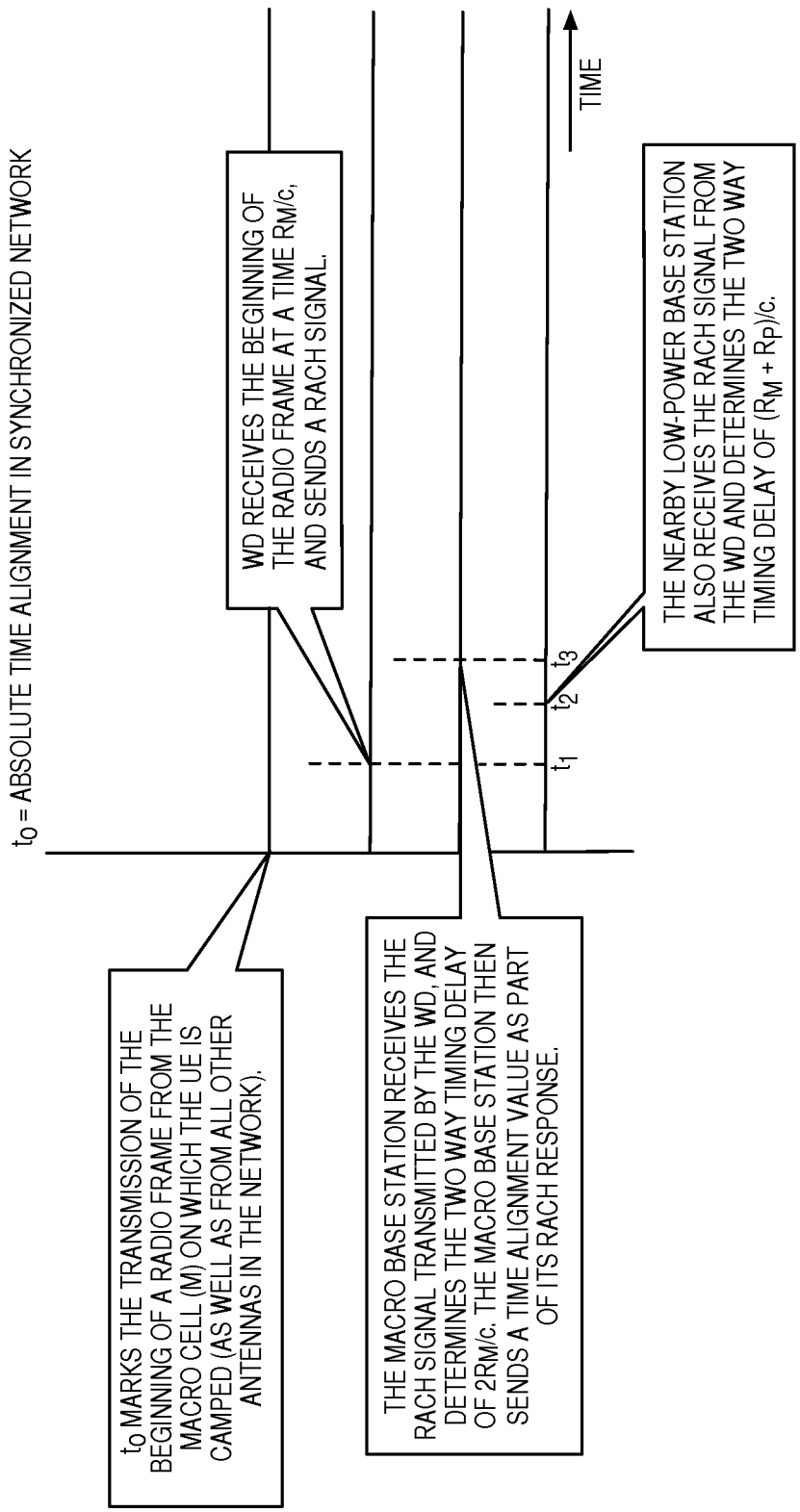
Figure 5:
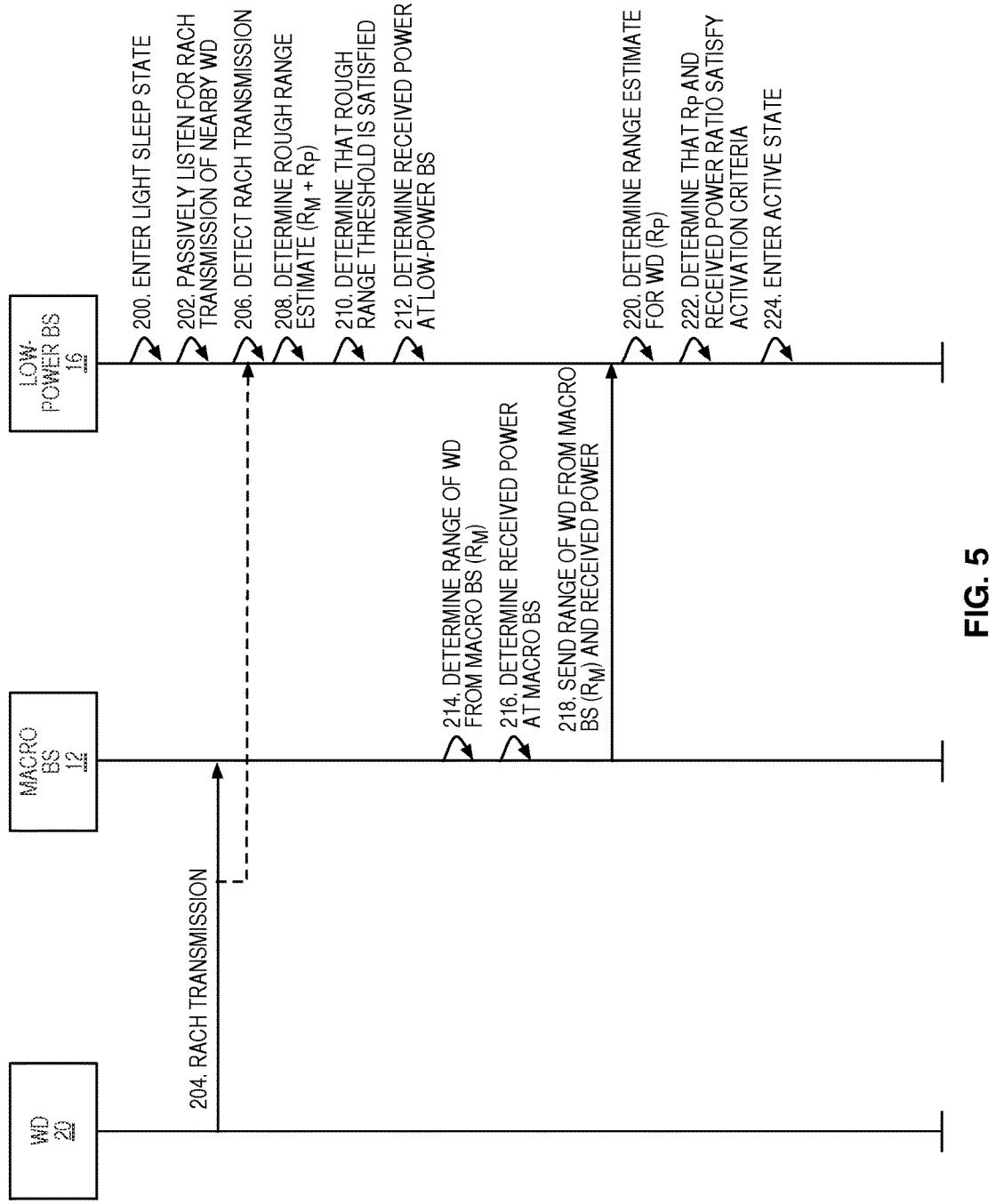
Figure 6A:
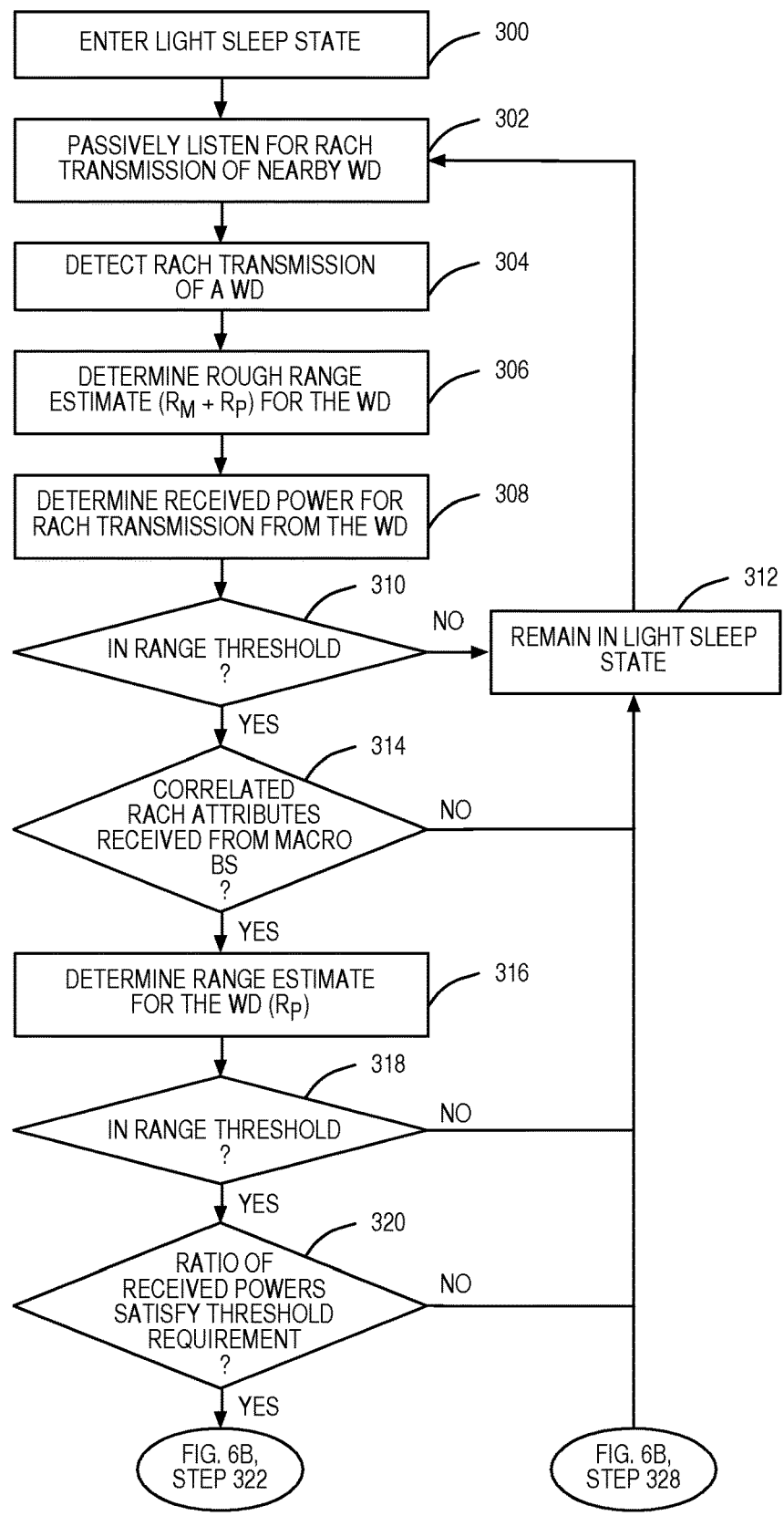
Figure 6B:
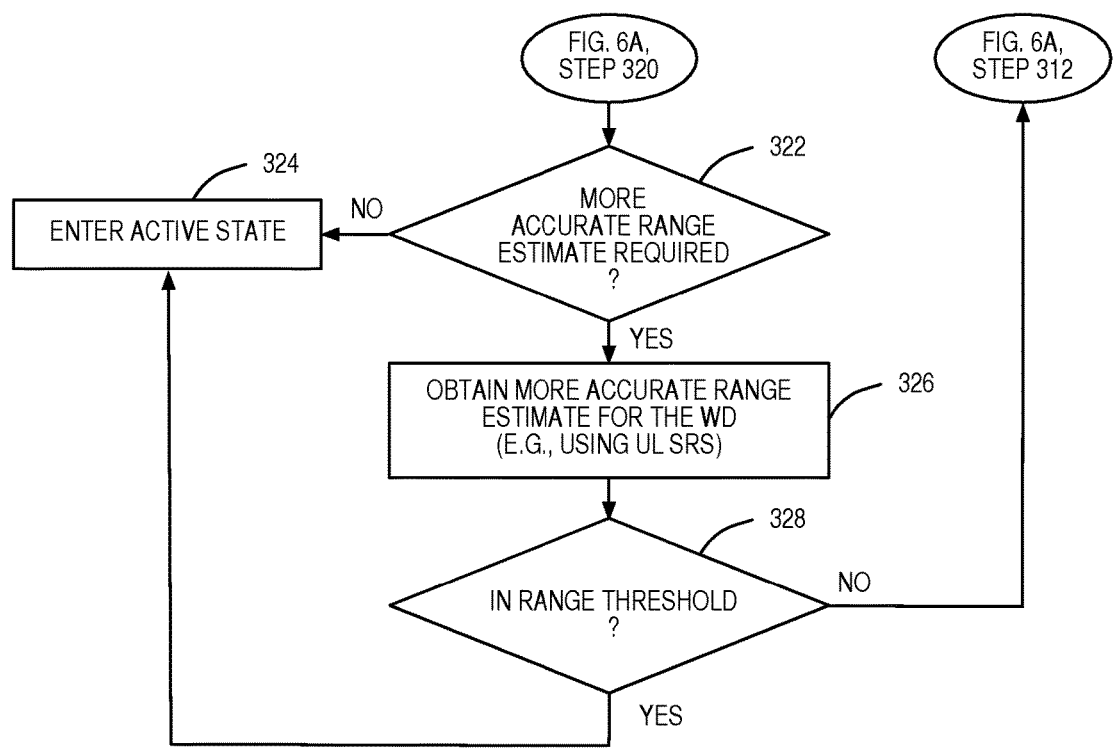
Figure 7:
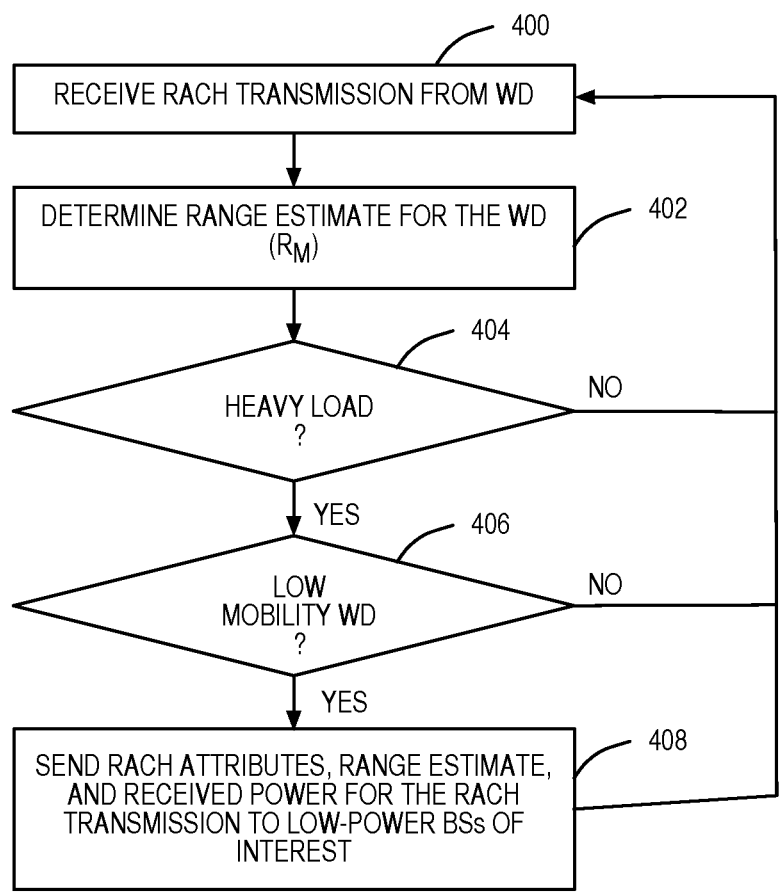
Figure 8:
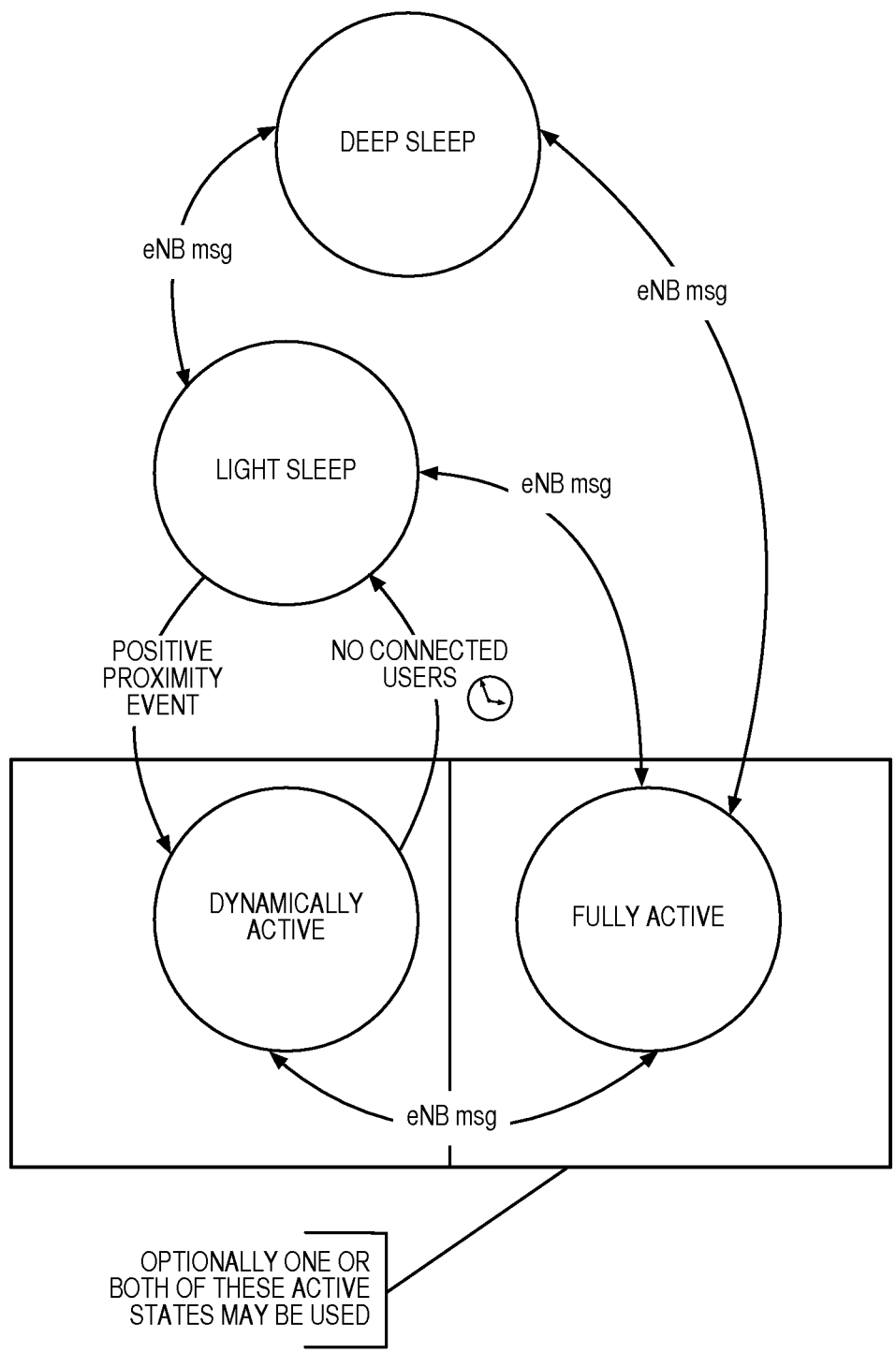
Figure 9:
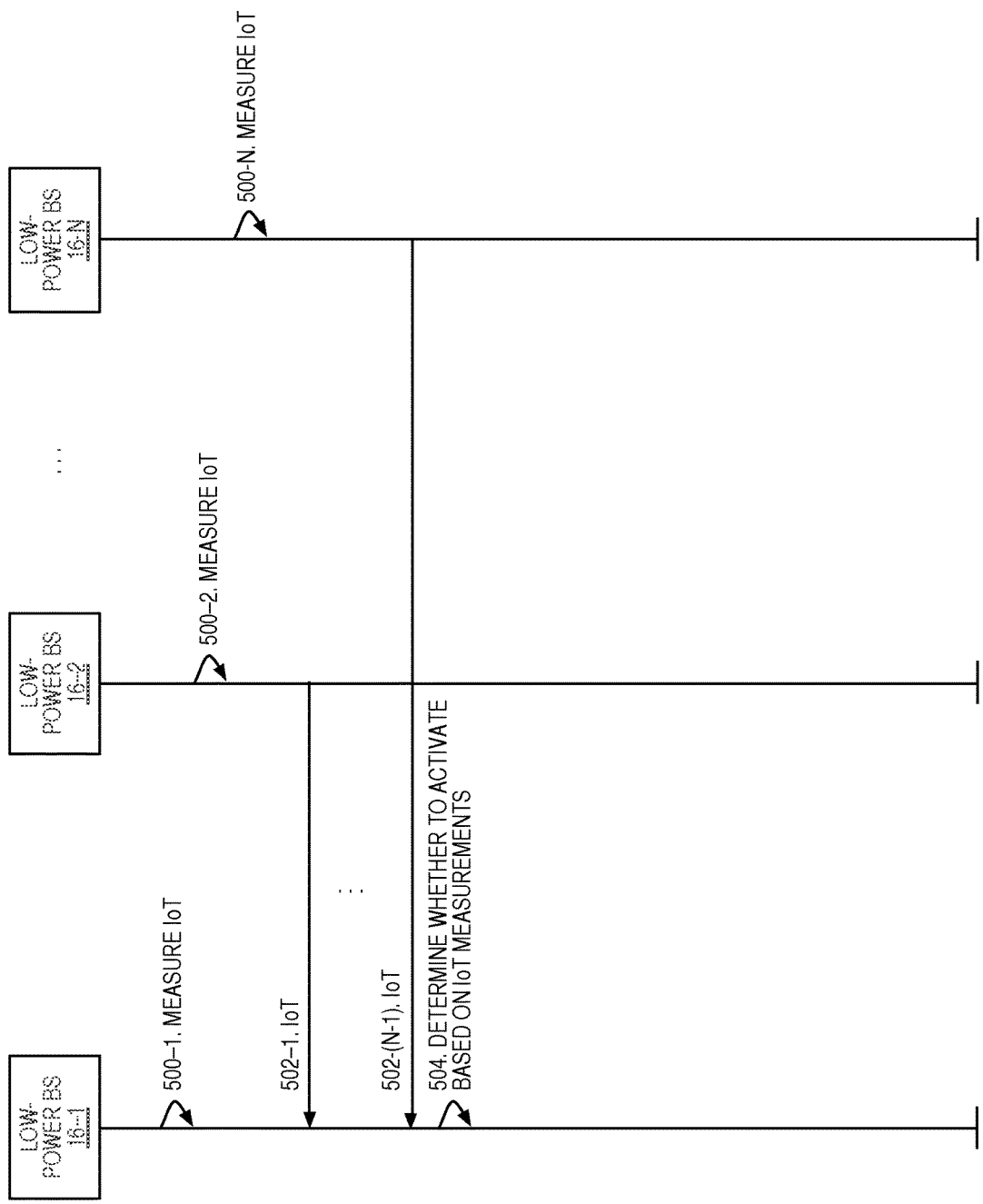
Figure 10:
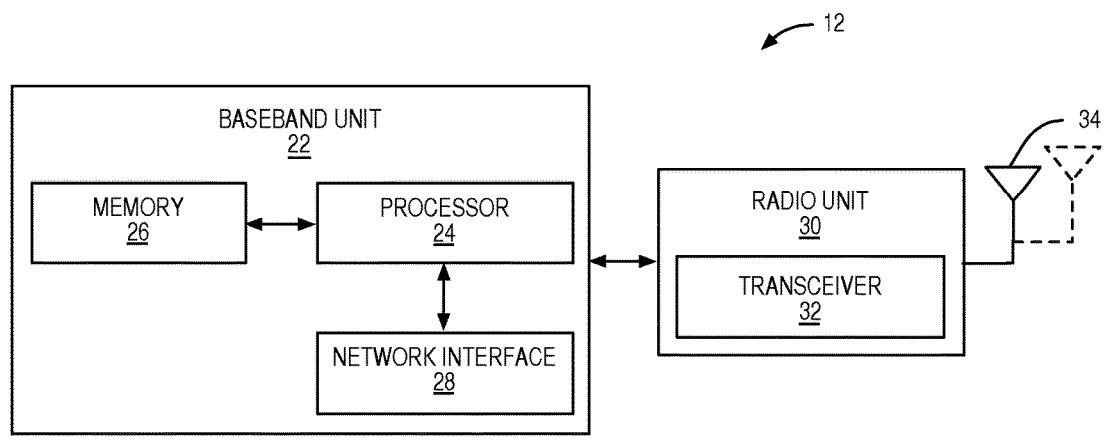
Figure 11:
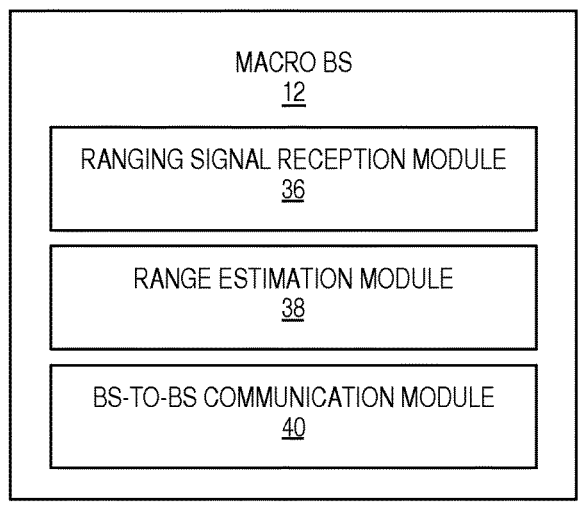
Figure 12:
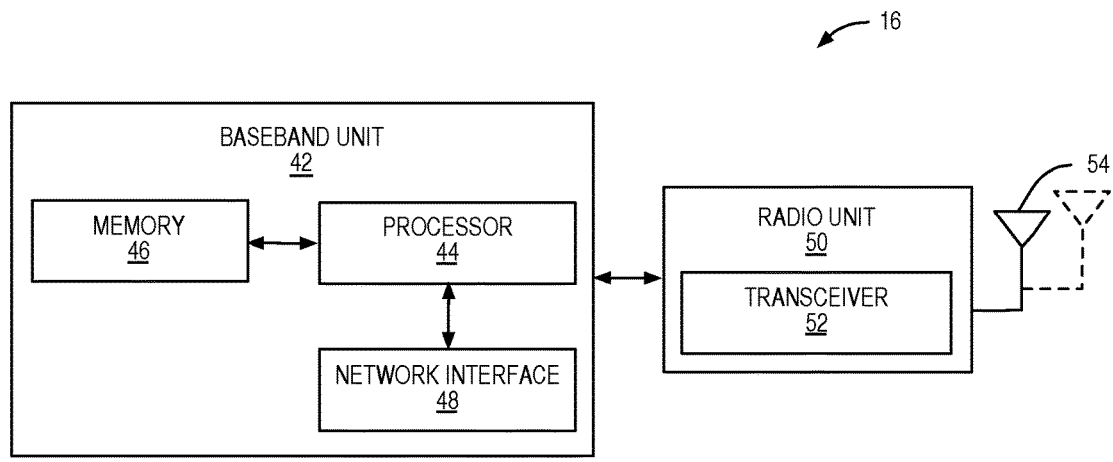
Figure 13:
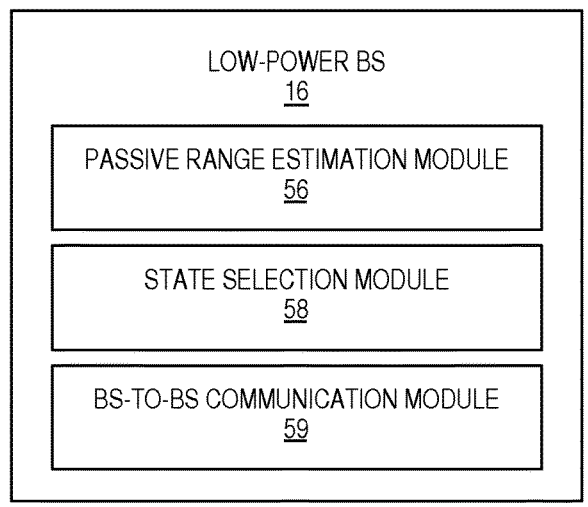
Figure 14:
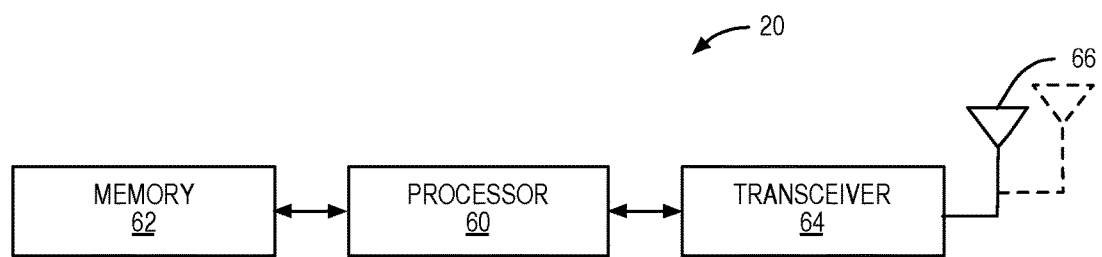
Figure 15:
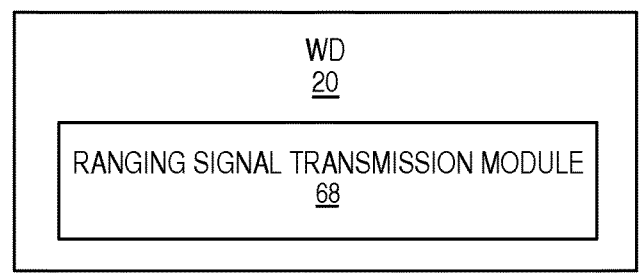

FIG. 3 graphically illustrates a process for passively determining a range between a wireless device and one of the low-power base stations of FIG. 1 according to one embodiment of the present disclosure;

FIG. 4 graphically illustrates a procedure by which a low-power base station passively determines a range between a wireless device and the low-power base station according to one embodiment of the present disclosure;

FIG. 5 illustrates the operation of the cellular network of FIG. 1 where one of the low-power base stations passively listens for a ranging signal transmitted by a wireless device in order to passively determine a range between the wireless device and the low-power base station and decides whether to activate based on the range estimate according to one embodiment of the present disclosure;

FIGS. 6A and 6B are a flow chart that illustrates the operation of the low-power base station to autonomously decide when to activate according to one embodiment of the present disclosure;

FIG. 7 is a flow chart that illustrates the operation of a macro base station to send information to low-power base stations of interest to assist in range estimation and/or the decision on whether to activate according to one embodiment of the present disclosure;

FIG. 8 is a state diagram for a low-power base station according to one embodiment of the present disclosure;

FIG. 9 illustrates the operation of a number of low-power base stations to perform Interference over Thermal (IoT) measurements and exchange the IoT measurements to enable a collaborative activation decision according to one embodiment of the present disclosure;

FIG. 10 is block diagram of a macro base station according to one embodiment of the present disclosure;

FIG. 11 is block diagram of a macro base station according to another embodiment of the present disclosure;

FIG. 12 is block diagram of a low-power base station according to one embodiment of the present disclosure;

FIG. 13 is block diagram of a low-power base station according to another embodiment of the present disclosure;

FIG. 14 is block diagram of a wireless device according to one embodiment of the present disclosure; and FIG. 15 is block diagram of a wireless device according to another embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for passive proximity detection of wireless devices in a cellular communications network are disclosed. In the embodiments described below, passive proximity detection is utilized for activating radio access nodes (e.g., base stations such as, for instance, enhanced Node B's (eNBs)) in a support layer of a Radio Access Network (RAN) of a cellular network. However, the embodiments of passive proximity detection disclosed herein may be utilized for other applications such as, e.g., wireless device positioning using a set of passive listening nodes (i.e., not fully active base stations) that listen for reference signals from wireless devices and perform wireless device positioning using, e.g., Uplink Time Difference of Arrival (UTDOA).

FIG. 1 illustrates a cellular network 10 according to one embodiment of the present disclosure. The cellular network 10 includes a number of macro base stations 12-1 through 12-3 (generally referred to herein collectively as macro base stations 12 and individually as macro base station 12) serving corresponding macro cells 14-1 through 14-3 (generally referred to herein collectively as macro cells 14 and individually as macro cell 14) and a number of low-power base stations 16-1 through 16-7 (generally referred to herein collectively as low-power base stations 16 and individually as low-power base station 16) serving corresponding small cells 18-1 through 18-7 (generally referred to herein collectively as small cells 18 and individually as small cell 18). The macro, or high-power, base stations 12 and the low-power base stations 16 are part of a RAN of the cellular network 10. The macro base stations 12 provide ubiquitous coverage for a desired geographic area and form what is referred to herein as a coverage layer of the RAN. Conversely, the low-power base stations 16 provide supplemental capacity (e.g., serve corresponding hotspots) and form what is referred to herein as a supporting layer of the RAN. Note that, for simplicity in description, the macro base stations 12 are described as forming the coverage layer controlling the low-power base stations 16 in the supporting layer. However, the coverage and supporting layers may include any type(s) of radio access nodes. However, regardless of the particular implementation, there is a hierarchy in energy state control and the mutual awareness of coverage overlap between the two layers.

In one embodiment, the cellular network 10 is a $3^{rd}$ Generation Partnership Project (3GPP) Long Term Evolution (LTE) network (i.e., an LTE network or an LTE-Advanced network), where the macro base stations 12 are eNBs and the low-power base stations 16 are any type(s) of low-power base stations, e.g., micro eNBs serving corresponding micro cells, pico eNBs serving corresponding pico cells, femto base stations serving corresponding femto cells, etc. Note that while the coverage layer includes only macro base stations 12 in the example of FIG. 1, the coverage layer may include other types of base stations (e.g., both macro and pico base stations). Also note that some of the embodiments described herein are for LTE and, as such, LTE terminology is sometimes used. However, the embodiments described herein are not limited to LTE.

The macro base stations 12 and the low-power base stations 16 provide wireless access to a number of wireless devices 20-1 through 20-7 (generally referred to herein collectively as wireless devices 20 and individually as wireless device 20). The wireless devices 20 may be any type of device(s) equipped with a cellular network interface (e.g., a transceiver) for communicating with the base stations 12 and 16. In LTE, the wireless devices 20 may be referred to as User Equipment devices (UEs). For example, the wireless devices 20 may be smartphones, tablet computers, notebook computers, or the like. The wireless devices 20 may additionally or alternatively include sensors (e.g., smart meters, etc.).

In order to reduce energy consumption by the RAN, the low-power base stations 16 in the supporting layer are deactivated, or placed in a low-energy state, when, e.g., the supplemental capacity provided by the low-power base stations 16 is not needed. For instance, the low-power base stations 16 may initially be configured in a sleep state. Thereafter, the low-power base stations 16 are activated as needed. In this manner, energy consumption of the RAN, particularly in the supporting layer, can be significantly reduced.

Figure 2:
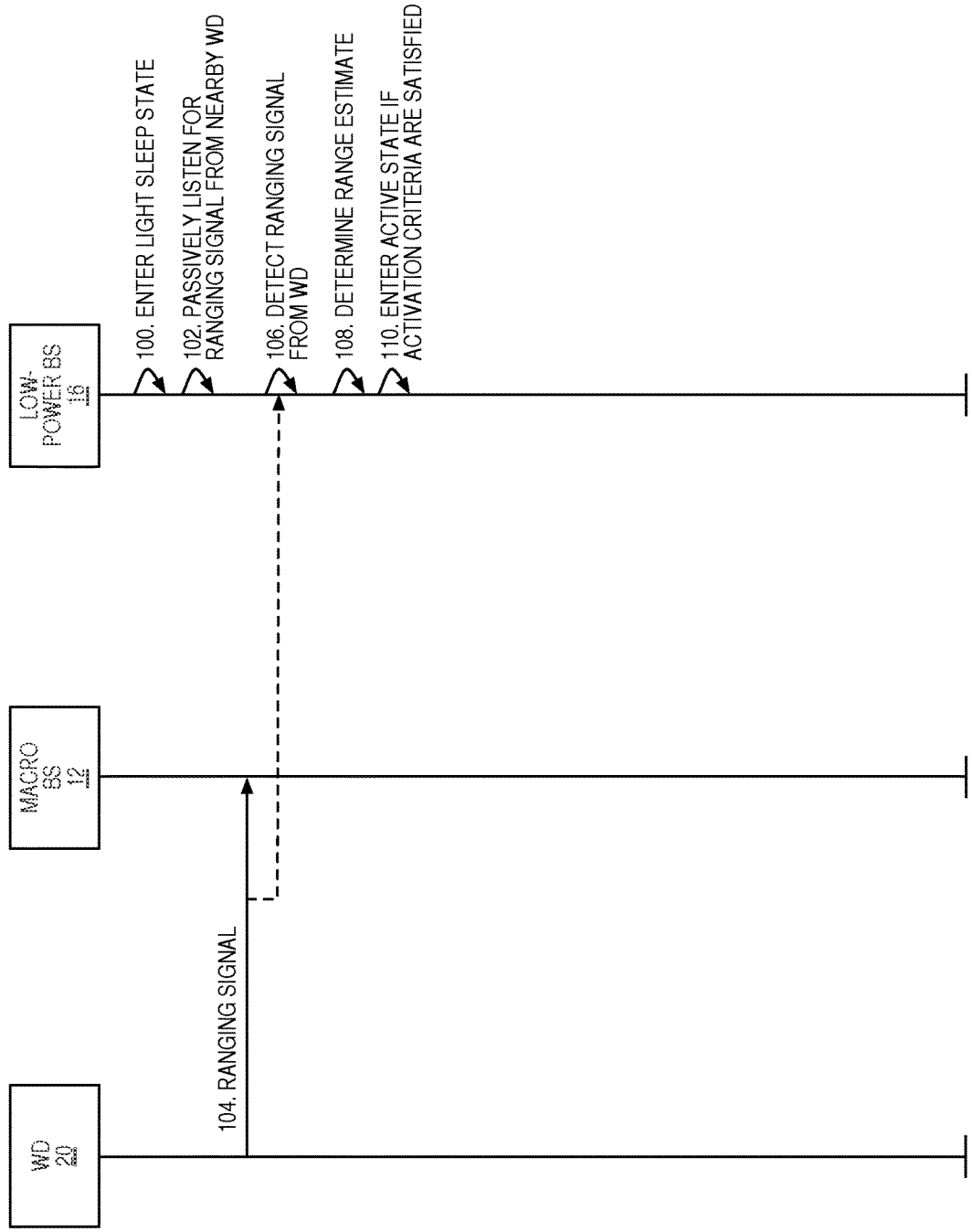
FIG. 2 illustrates the operation of the cellular network of FIG. 1 where one of the low-power base stations passively detects the proximity of one of the wireless devices and, in response, activates according to one embodiment of the present disclosure.

As discussed below in detail, in one embodiment, the low-power base stations 16 operate to autonomously decide when to activate utilizing a passive proximity detection scheme for detecting when a wireless device 20 is proximate to the low-power base station 16, e.g., within the small cell 18 or coverage area of the low-power base station 16. In this regard, FIG. 2 illustrates the operation of the cellular network 10 of FIG. 1 to provide a procedure by which one of the low-power base stations 16 autonomously decides to activate in response to passively detecting the proximity of one of the wireless devices 20 according to one embodiment of the present disclosure. Note that in FIG. 2 and all other flow charts or diagrams illustrating process steps, the ordering of the steps illustrated in the figures is only an example. The steps may be performed in any desired manner unless explicitly stated or otherwise required.

At some point, the low-power base station 16 enters a light sleep state (step 100). As used herein, the light sleep state is a state in which the low-power base station 16 passively listens (e.g. is listening for signals, but not transmitting) for ranging signals from nearby wireless devices 20 (e.g., any wireless devices 20 that transmit a ranging signal with sufficient power to be detected by the low-power base station 16). However, during the light sleep state the low-power base station 16 is not fully active. For instance, when operating in the light sleep state, the low-power base station 16 may listen for ranging signals from nearby wireless devices 20 and monitor for communication from a macro base station(s) 12, e.g., via an X2 or similar base-station-to-base-station connection. As used herein, "passively listening" refers to listening for a ranging signal transmitted from a wireless device 20 (e.g., any wireless device 20) to another base station (e.g., one of the macro base stations 12 operating as an anchor base station for the wireless device 20).

After entering the light sleep state, the low-power base station 16 passively listens for a ranging signal from a nearby wireless device 20 (step 102). While the low-power base station 16 is passively listening for a ranging signal, the wireless device 20 transmits a ranging signal to one of the macro base stations 12 (step 104). This macro base station 12 is referred to herein as an anchor base station, or anchor node, of the wireless device 20. However, the anchor node is not necessarily a macro base station and can be any base station or any node to which the wireless device 20 transmits a ranging signal. As used herein, a ranging signal is any Radio Frequency (RF) signal transmitted by a wireless device 20 from which ranging information can be extracted. While any suitable ranging signal may be used, in one embodiment, the ranging signal is a Random Access Channel (RACH) transmitted by the wireless device 20 and, in this regard, the wireless device 20 can be referred to as being camped on the macro cell 14 served by the macro base station 12. In another embodiment, the ranging signal is an uplink reference signal such as, for example, an uplink Sounding Reference Signal (SRS). Note that for RACH, the low-power base station 16 typically only has to listen once every radio frame. Therefore, the energy expended in listening for RACH is very small. Similarly, the uplink SRS is only one symbol in a subframe, and has a periodicity of the order of 40 milliseconds (ms). As such, listening for uplink SRS consumes very little processing power, and thus energy, in the low-power base station 16.

In this example, the wireless device 20 is sufficiently near the low-power base station 16 that, while passively listening for a ranging signal, the low-power base station 16 detects the ranging signal transmitted from the wireless device 20 to the macro base station 12 (step 106). Note that, the low-power base station 16 may passively listen for only one type of ranging signal (e.g., RACH) or may passively listen for any signal of a defined set of signals (or signal types) from which ranging information can be extracted. Then, the low-power base station 16 determines a range estimate for a range between the wireless device 20 and the low-power base station 16 based on the detected ranging signal and, in some embodiments, ranging assistance information received from the anchor node of the wireless device 20 (step 108).

The range estimate may be generated using any suitable procedure. Embodiments of a procedure for generating the range estimate based on the ranging signal are discussed below. The low-power base station 16 then decides whether to activate based on the range estimate. In this embodiment, the low-power base station 16 decides to enter an active state (i.e., a fully active state) if one or more activation criteria are satisfied (step 110). The activation criteria include at least one range-based criteria such as, for example, a criterion that the range estimate satisfies a predefined range threshold, which may be, e.g., defined by a standard or configured by the cellular network 10. In one embodiment, the range threshold is defined such that a range estimate that satisfies the range threshold is indicative of the wireless device 20 being within the small cell 18 or coverage area of the low-power base station 16. If the low-power base station 16 is activated, the wireless device 20 may, in some embodiments, cease attempting to access the macro cell 14 and connect to the small cell 18 served by the low-power base station 16 (e.g., when the ranging signal is a RACH transmission of the wireless device 20). In other embodiments, the wireless device 20 may be handed over from the macro cell 14 to the small cell 18 served by the low-power base station 16 once the low-power base station 16 enters the active state.

FIGS. 3 and 4 graphically illustrate a process for generating the range estimate for the range between the wireless device 20 and the low-power base station 16 in the process of, e.g., FIG. 2, according to one embodiment of the present disclosure. In this embodiment, the cellular network 10 is a synchronous network (i.e., the timing of the macro base stations 12 and the low-power base stations 16 is synchronized). Also, in this example, the ranging signal transmitted by the wireless device 20 is RACH. However, this same discussion is applicable to other types of ranging signals (e.g., Uplink Sounding Reference Signal (UL SRS)). As illustrated, in FIG. 3, based on the ranging signal transmitted by the wireless device 20, the macro base station 12 determines a range ($R_M$) between the wireless device 20 and the macro base station 12. Further, based on the ranging signal passively detected at the low-power base station 16 and ranging assistance information (e.g., RACH ID and $R_M$) from the macro base station 12, the low-power base station 16 determines the range estimate for the range ($R_P$) between the wireless device 20 and the low-power base station 16.

More specifically, as illustrated in FIG. 4 and using RACH as an example, a time $t_0$ marks the transmission of the start of a radio frame from the macro base station 12 for the macro cell 14 on which the wireless device 20 is camped. Because the cellular network 10 is synchronized, the time $t_0$ is also the start of transmission of a radio frame from all other antennas in the cellular network 10. At a time $t_1$, the wireless device 20 receives the start of the radio frame and transmits a RACH signal, where:

$$t_1 - t_0 = R_M/c, \quad (1)$$

where c is the speed of light in a vacuum which is approximately $3 \times 10^8$ meters/second. At a time $t_2$, the low-power base station 16 receives the RACH signal transmitted by the wireless device 20 and determines a two-way timing delay ($d_{P,2WAY}$). The two-way timing delay ($d_{P,2WAY}$) is defined as:

$$d_{P,2WAY} = t_2 - t_0 = (R_M + R_P)/c. \quad (2)$$

In other words, the delay between $t_0$ and the time of reception of the RACH signal at the low-power base station 16 is equal to the delay between the macro base station 12 and the wireless device 20 ($R_M/c$) plus the delay between the wireless device 20 and the low-power base station 16 ($R_P/c$).

At a time $t_3$, the macro base station 12 receives the RACH signal transmitted by the wireless device 20 and determines a two-way timing delay ($d_{M,2WAY}$) between the macro base station 12 and the wireless device 20. The two-way timing delay ($d_{M,2WAY}$) is defined as:

$$d_{M,2WAY} = t_3 - t_0 = 2R_M/c. \quad (3)$$

Since the value of $t_3 - t_0$ is known, the macro base station 12 can determine a range estimate for the range between the macro base station 12 and the wireless device 20 in terms of either a distance (i.e., $R_M$) or a timing delay (e.g., $R_M/c$) based on Equation (3). Note that, according to the conventional random access procedure, the macro base station 12 may send a RACH response to the wireless device 20 including a time alignment value that corrects for the timing delay ($R_M/c$). In this embodiment, the macro base station 12 then provides the range estimate for the range ($R_M$) between the macro base station 12 and the wireless device 20 to the low-power base station 16. Then, since the value of $t_2 - t_0$ is known, the low-power base station 16 then determines the range estimate for the range between the low-power base station 16 and the wireless device 20 ($R_P$) based on the range estimate for the range ($R_M$) received from the macro base station 12 based on Equation (2). Again, the range estimate for the range ($R_P$) may be expressed in terms of a distance ($R_P$) or a time delay ($R_P/c$).

FIG. 5 illustrates the operation of the wireless device 20, the macro base station 12, and the low-power base station 16 according to one embodiment of the present disclosure in which the range estimation procedure described above with respect to FIGS. 3 and 4 is utilized. Otherwise, the process of FIG. 5 is similar to that of FIG. 2. At some point, the low-power base station 16 enters a light sleep state (step 200). After entering the light sleep state, the low-power base station 16 passively listens for a RACH signal transmitted by a nearby wireless device 20, as discussed above (step 202). While the low-power base station 16 is passively listening for a RACH signal, the wireless device 20 transmits a RACH signal to the macro base station 12 (step 204). The wireless device 20 transmits the RACH signal when, e.g., attempting to connect to the macro cell 14 served by the macro base station 12.

In this example, the wireless device 20 is sufficiently near the low-power base station 16 that, while passively listening for a RACH signal, the low-power base station 16 detects the RACH signal transmitted from the wireless device 20 to the macro base station 12 (step 206). Typically, the wireless device 20 transmits the RACH signal when the wireless device 20 is attempting to establish a connection with the macro cell 14 served by the macro base station 12. However, the macro base station 12 may alternatively force specific wireless devices 20 of interest to transmit a RACH signal through, e.g., a Physical Downlink Control Channel (PDCCH) order. Then, based on the detected RACH signal, the low-power base station 16 determines a rough, or initial, range estimate for the range between the wireless device 20 and the low-power base station 16 (step 208). The rough range estimate is, in this embodiment, the two-way timing delay ($d_{P,2WAY}$) as defined in Equation (2) above. The rough range estimate may be represented as a distance (i.e., $R_M + R_P = c(t_2 - t_0)$) or a timing delay (i.e., $(R_M + R_P)/c = t_2 - t_0$).

The low-power base station 16 then determines that one or more rough range criteria are satisfied based on the rough range estimate (step 210). In one embodiment, the one or more rough range criteria include a predefined rough range threshold, which may be, e.g., defined by a standard or configured by the cellular network 10. The rough range threshold is defined such that, if the rough range estimate does not satisfy the rough range threshold, the low-power base station 16 can be sufficiently certain that the wireless device 20 is not within the small cell 18 or coverage area of the low-power base station 16. If that is the case, then the low-power base station 16 can decide to remain in the light sleep state and discontinue the process (e.g., return to step 202 to passively listen for a new RACH transmission). However, in this example, the one or more rough range estimate criteria are satisfied and, as such, the process continues. In this embodiment, in addition to determining the rough range estimate, the low-power base station 16 determines a received power for the RACH signal at the low-power base station 16 (step 212). Any suitable technique for measuring the received power of the RACH signal can be used.

The macro base station 12 also receives the RACH signal transmitted by the wireless device 20. Based on the RACH signal, the macro base station 12 generates a range estimate for the range ($R_M$) between the macro base station 12 and the wireless device 20, as discussed above (step 214). In addition, in this embodiment, the macro base station 12 also determines a received power of the RACH signal at the macro base station 12 (step 216). The macro base station 12 then sends information including the range estimate for the range ($R_M$) and, in this embodiment, the received power of the RACH signal at the macro base station 12 to the low-power base station 16 (step 218). More generally, the macro base station 12 may send any information that is beneficial for the low-power base station 16 in deciding whether to activate. The information is, in one embodiment, sent via a base-station-to-base-station connection such as, for example, an X2 connection. The X2 interface may be enhanced to allow for exchange of this information and/or a private messaging mechanism over the X2 interface may be used. This information includes ranging assistance information, which in this example is the range estimate of the range ($R_M$). However, in another embodiment, the ranging assistance information may include partially or fully processed data received by the macro base station 12, which may enable more accurate range estimation at the low-power base station 16. This partially or fully processed data is data resulting from partially or fully processing the reference signal at the macro base station 12. The information sent from the macro base station 12 to the low-power base station 16 may include additional information (i.e., information in addition to the ranging assistance information) such as, for example:

- Cell Identifier (CID) of the coverage cell(s) of interest,
- RACH information of the RACHing wireless device 20 (e.g., RACH preamble parameters, RACH receive power, and/or RACH signature),
- Indicator to activate immediately if coarse, or rough, range estimate and power estimate show that the wireless device 20 is nearby (e.g., satisfy one or more rough range estimate parameters),
- Cell Radio Network Temporary Identity (C-RNTI) of the wireless device(s) 20 of interest,
- Uplink scheduling information (e.g., for Physical Uplink Shared Channel (PUSCH), Physical Uplink Control Channel (PUCCH), or SRS) for the wireless device 20,
- Signal to cancel consideration of any particular wireless device 20,
- Wake-up, sleep, etc. signal (e.g., energy state change signal),
- Interference over Thermal (IoT) value(s), and/or
- Estimate of the speed or mobility of the wireless device 20.

In some embodiments, the low-power base station 16 may be able to "sniff" some or all of this additional information over the air (rather than receiving it from the macro base station 12). However, communication of the additional information from the macro base station 12 may be more reliable and would not require additional RF receive capabilities in the low-power base station 16.

Note that, as discussed below, the macro base station 12 may send the information of step 218 to all neighboring low-power base stations 16 or to only those neighboring low-power base stations 16 to which the information is potentially of interest. For example, in one embodiment, a layout of the low-power base stations 16 is known to the cellular network 10, and the macro base station 12 knows the layout of its neighboring low-power base stations 16. In one embodiment, the macro base station 12 knows a list of neighboring low-power base stations 16 in its vicinity and, e.g., distances from the macro base station 12 to each of those neighboring low-power base stations 16. This information may be configured into the cellular network 10 by an operator of the cellular network 10, determined anonymously as, e.g., described in U.S. patent application Ser. No. 14/241,796 entitled AUTONOMOUS DETERMINATION OF OVERLAPPING COVERAGE IN HETEROGENEOUS NETWORKS, filed Feb. 27, 2014, or otherwise known to the macro base station 12. Using the known layout of the low-power base stations 16 and, e.g., the range of the wireless device 20 from the macro base station 12, the macro base station 12 is enabled to identify low-power base stations 16 to which the wireless device 20 is potentially of interest (e.g., the low-power base stations 16 of the small cells 18 in which the wireless device 20 may be located).

Next, based on the range estimate for the range ($R_M$), the low-power base station 16 then generates a range estimate for the range ($R_P$) between the wireless device 20 and the low-power base station 16, as discussed above (step 220). The low-power base station 16 then determines that the range estimate for the range ($R_P$) and the received powers for the RACH signal at the low-power base station 16 and the macro base station 12 satisfy one or more activation criteria (step 222). More specifically, in one embodiment, the activation criteria include a range threshold for the range estimate for the range ($R_P$) as well as a threshold ratio for a ratio of the received power of the RACH signal at the low-power base station 16 and the received power of the RACH signal at the macro base station 12. The received power ratio is beneficial in that, depending on, e.g., obstructions between the low-power base station 16 and the wireless device 20, activation of the low-power base station 16 may not be desired even if the range estimate for the range ($R_P$) satisfies the range threshold. For example, if the range threshold is satisfied but the received power ratio indicates that the received power of the RACH signal at the macro base station 12 is better than the received power of the RACH signal at the low-power base station 16 (e.g., due to obstructions), then the low-power base station 16 may decide not to activate. Additional activation criteria may be evaluated at the macro base station 12 or the low-power base station 16 such as, for example, a mobility of the wireless device 20 being less than a threshold, a heavy load condition in the macro cell 14, or the like, or any combination thereof. In this example, the low-power base station 16 decides to activate and, as such, enters the active state (step 224).

FIGS. 6A and 6B depict a flow chart that illustrates the operation of the low-power base station 16 according to one embodiment of the present disclosure. The operation of the low-power base station 16 depicted in this flow chart is similar to that described above with respect to FIG. 5. First, at some point, the low-power base station 16 enters the light sleep state (step 300). While in the light sleep state, the low-power base station 16 passively listens for RACH transmission by a nearby wireless device 20 (step 302). While passively listening, the low-power base station 16 detects a RACH signal transmitted by a wireless device 20 (step 304). Upon detecting the RACH signal, the low-power base station 16 determines, or generates, a rough range estimate ($R_M + R_P$) or alternatively ($R_M + R_P$)/c for the range ($R_P$) between the wireless device 20 and the low-power base station 16, as described above (step 306). In addition, in this embodiment, the low-power base station 16 determines a received power of the RACH signal received at the low-power base station 16 (step 308).

The low-power base station 16 determines whether the rough range estimate satisfies a predefined range threshold for the rough range estimate (step 310). This predefined range threshold may be, e.g., defined by a standard or configured by the cellular network 10. Further, in one embodiment, this range threshold is defined such that, if the rough range estimate does not satisfy the range threshold, the low-power base station 16 can be sufficiently certain that the wireless device 20 is not in the small cell 18 or coverage area of the low-power base station 16. Conversely, if the rough range estimate does satisfy the range threshold, then the wireless device 20 may be in the small cell 18 or coverage area of the low-power base station 16.

If the rough range estimate does not satisfy the range threshold, the low-power base station 16 remains in the light sleep state (step 312), and the process returns to step 302. On the other hand, if the rough range estimate does satisfy the range threshold, the low-power base station 16 determines whether correlated RACH attributes, which are also referred to herein as correlated RACH ranging assistance information 12, were received from the macro base station 12 (step 314). The correlated RACH attributes are RACH attributes for the same wireless device 20 from which the low-power base station 16 received the RACH signal in step 302. The correlated RACH attributes include ranging assistance information, which in this embodiment include a range estimate for the range ($R_M$) between the macro base station 12 and the wireless device 20. However, as discussed above, the ranging information may alternatively include the raw RACH signal received by the macro base station 12 from the wireless device 20. In addition to the ranging assistance information, the RACH attributes may include additional information such as the additional information discussed above.

If correlated RACH attributes have not been received, the low-power base station 16 remains in the light sleep state (step 312), and the process returns to step 302. If correlated RACH attributes have been received, the low-power base station 16 determines, or generates, a range estimate for the range ($R_P$) between the wireless device 20 and the low-power base station 16 based on the ranging assistance information included in the correlated RACH attributes and either the ranging signal received in step 302 or, similarly, the rough estimate of the range ($R_P$) determined in step 306 (step 316). The low-power base station 16 then determines whether the range estimate for the range ($R_P$) determined in step 316 satisfies a predefined range threshold (step 318). This range threshold of step 318 may be the same as that of step 310, but is typically a different (e.g., smaller) range threshold. The range threshold may be, e.g., defined by a standard or configured by the cellular network 10. In one embodiment, the range threshold is such that, if the range estimate of step 316 does not satisfy the range threshold, then the low-power base station 16 is sufficiently certain that the wireless device 20 is not within the small cell 18 or coverage area of the low-power base station 16. Conversely, if the range estimate does satisfy the range threshold, then the wireless device 20 is likely to be in the small cell 18 or coverage area of the low-power base station 16.

If the range estimate does not satisfy the range threshold, then the low-power base station 16 remains in the light sleep state (step 312), and the process returns to step 302. Otherwise, if the range estimate does satisfy the range threshold, then the low-power base station 16 determines whether a ratio of the received power of the RACH signal at the low-power base station 16 and the received power of the RACH signal at the macro base station 12 satisfies a predefined received power ratio requirement or threshold (step 320). The received power ratio threshold may be, e.g., defined by a standard or configured by the cellular network 10. The received power ratio threshold is defined such that the low-power base station 16 is not activated, even if the range estimate satisfies the range threshold, if the received power of the RACH signal at the low-power base station 16 does not meet a minimum requirement. In this particular embodiment, the minimum requirement is in terms of the ratio of the received power at the two base stations 12 and 16. Consideration of the received power ratio threshold may be beneficial because, even if the wireless device 20 is physically closer to the low-power base station 16 than the macro base station 12, there may be, e.g., radio obstructions that cause the received signal at the low-power base station 16 to be weaker than the received signal at the macro base station 12/anchor base station. In another embodiment, the low-power base station 16 may consider only the received power at the low-power base station 16 rather than both the received power at the low-power base station 16 and the received power at the macro base station 12 (e.g., the low-power base station 16 remains in the light sleep state if the received power at the low-power base station 16 is not greater than a predefined power threshold).

If the ratio of the received power values does not satisfy the threshold requirement, then the low-power base station 16 remains in the light sleep state (step 312), and the process returns to step 302. Conversely, if the ratio of the received power values does satisfy the threshold requirement, then the low-power base station 16 determines whether a more accurate range estimate is needed (step 322). For example, in one embodiment, the range estimate previously generated is based on RACH, which has an error between 150 and 300 meters. A more accurate range estimate may be needed if such an estimate is needed to decide whether the wireless device 20 is actually in the small cell 18 or coverage area of the low-power base station 16. Note that step 322 is optional and may not be included in some embodiments or implementations.

If a more accurate range estimate is not needed, then the low-power base station 16 enters the active state (step 324). One advantage of activating the low-power bases station 16 early rather than waiting for a more accurate or refined range estimate is to avoid the overhead of connection establishment in the macro base station 12. If the macro base station 12 blocks connection set-up of the wireless device 20, there can be time for the wireless device 20 to acquire the pilot of the newly activated low-power bases station 16 and preferentially connect with it.

Conversely, if a more accurate range estimate is needed, the low-power base station 16 obtains a more accurate range estimate for the range ($R_P$) between the wireless device 20 and the low-power base station 16 (step 326). This more accurate range estimate can be obtained using any suitable ranging technique. For example, in one embodiment, the low-power base station 16 continues to passively listen to the wireless device 20 after the wireless device 20 has connected to the macro cell 14 served by the macro base station 12. Using LTE as an example, the low-power base station 16 employs a C-RNTI of the wireless device 20 and scheduling information for the wireless device 20, both of which may be sent to the low-power base station 16 from the macro base station 12, to listen to uplink channels transmitted by the wireless device 20. Using the uplink channels, a more accurate range estimate can be obtained. In particular, the uplink SRS transmitted by the wireless device 20 provides an excellent channel to use for ranging. Using UL SRS gives accuracy of up to 15 meters. In particular, once the wireless device 20 is connected to the macro base station 12, the range between the wireless device 20 and the macro base station 12 is continuously refined to produce range estimates up to 15 meters in accuracy. In this regard, the uplink SRS provides very good ranging performance. The range calculation based on uplink SRS is performed in a manner analogous to that used in the RACH calculation described above.

Once the more accurate range estimate is obtained, the low-power base station 16 determines whether the more accurate range estimate satisfies a predefined range threshold (step 328). This range threshold may or may not be the same as that in step 318. If the range threshold is satisfied, the low-power base station 16 enters the active state (step 324). If the range threshold is not satisfied, the low-power base station 16 remains in the light sleep state (step 312), and the process returns to step 302.

FIG. 7 is a flow chart that illustrates the operation of one of the macro base stations 12 according to one embodiment of the present disclosure. As illustrated, the macro base station 12 receives a RACH signal transmitted by a wireless device 20 (step 400). Based on the RACH signal, the macro base station 12 determines a range estimate for the range ($R_M$) between the macro base station 12 and the wireless device 20, as described above (step 402). The macro base station 12 also determines whether one or more low-power base station activation criteria are satisfied. In this embodiment, the one or more criteria include a criterion that the macro cell 14 is under a heavy load and a criterion that the wireless device 20 has low mobility. Note, however, that additional or alternative criteria may be used.

More specifically, in this embodiment, the macro base station 12 determines whether the macro cell 14 of the macro base station 12 is experiencing a heavy load condition (e.g., the load on the macro cell 14 is greater than a predefined threshold) and whether the wireless device 20 has low mobility (e.g., the speed of the wireless device 20 is less than a predefined threshold) (steps 404 and 406). If either of these conditions is not satisfied, the process returns to step 400 and is repeated for a next received RACH signal. However, if both of the conditions of steps 404 and 406 are satisfied, the macro base station 12 sends RACH attributes for the wireless device 20 (e.g., RACH ID), the range estimate determined in step 402 and, in some embodiments, the received power of the RACH signal received in step 400 to low-power base stations 16 of interest (step 408). As discussed above, the macro base station 12 may send additional information to the low-power base stations 16 of interest. As also discussed above, the low-power base stations 16 of interest are those low-power base stations 16 of the small cells 18 in which the wireless device 20 may potentially be located.

While the macro base station 12 may use any suitable process for identifying the low-power base stations 16 of interest, in one embodiment, the macro base station 12 utilizes a known layout of neighboring low-power base stations 16. The neighboring low-power base stations 16 are low-power base stations 16 serving small cells 18 that are located entirely within or overlap the macro cell 14 served by the macro base station 12. Then, based on information such as, for example, the range estimate for the range ($R_M$) between the macro base station 12 and the wireless device 20 and the known layout of the neighboring low-power base stations 16 (e.g., distances of the neighboring low-power base stations 16 from the macro base station 12), the macro base station 12 determines which of the low-power base stations 16 serve small cells 18 in which the wireless device 20 may potentially be located. Once the information is sent in step 408, the process returns to step 400 and is repeated.

FIG. 8 illustrates a state diagram for a low-power base station 16 according to one embodiment of the present disclosure. As illustrated, the low-power base station 16 has a deep sleep state, a light sleep state, and either or both of a dynamically active state and a fully active state. In the deep sleep state, the low-power base station 16 supports a minimum activity required to monitor a backhaul connection, e.g., base-station-to-base-station connection such as an X2 connection to a neighboring macro base station 12, for a wake-up signal. As discussed above, in the light sleep state, the low-power base station 16 is in a passive listen-only mode. In the passive listening mode, the low-power base station 16 can auto-sense when a wireless device 20 is close by and determine if a higher level of activity would be useful. In the dynamically active state, the low-power base station 16 semi-autonomously transitions back and forth between active and light sleep depending on the presence of wireless devices 20 of interest. When there are no wireless devices 20 in sufficient proximity for the low-power base station 16 to be active, the low-power base station 16 reverts from the dynamically active state to the light sleep state. In one embodiment, some time-based hysteresis is applied for transitioning to the light sleep state to avoid rapid oscillation between the light sleep and dynamically active states. The fully active state is a state in which the low-power base station 16 is always advertising its presence over the air and is in constant readiness to provide service to any wireless device 20 that connects to the cellular network 10 through it. In one embodiment, in all cases except for the transitions between the light sleep and dynamically active states, the state transitions are controlled by network messages. These messages can originate from a macro base station 12 in the coverage layer or from a higher level node in the cellular network 10.

Thus far, the description has focused on embodiments that utilize passive proximity detection to decide on when to activate the low-power base stations 16. However, in addition to passive proximity detection or as an alternative to passive proximity detection, the low-power base stations 16 may utilize passive measurements of IoT by the low-power base stations 16 along with sharing of the IoT measurements between the low-power base stations 16 to enable a cooperative mutual decision on the best low-power base station 16 for activation. One embodiment of such a process is illustrated in FIG. 9. As illustrated, a number of low-power base stations 16-1 through 16-N (e.g., neighboring low-power base stations 16) passively measure IoT to provide corresponding IoT measurements (steps 500-1 through 500-N). At this point, the low-power base stations 16-1 through 16-N are in a sleep state (e.g., a light sleep state). In this example, the low-power base stations 16-2 through 16-N send their IoT measurements to the low-power base station 16-1 (steps 502-1 through 502-(N−1)). The low-power base station 16-1 then determines, or decides, whether to activate based on the IoT measurements made by the low-power base stations 16-1 through 16-N (step 504). For example, the low-power base station 16-1 may decide to activate if the IoT measurement made by the low-power base station 16-1 is greater than the IoT measurements made by the other low-power base stations 16-2 through 16-N and is greater than a predefined minimum threshold. In the same manner, the IoT measurements may be provided to the other low-power base stations 16-2 through 16-N and utilized by those low-power base stations 16-2 through 16-N to decide whether to activate. Again, the IoT measurements of FIG. 9 may be utilized apart from passive proximity detection or together with passive proximity detection.

While the macro base stations 12 (or any type of radio access nodes in the coverage layer) may be implemented in hardware or any combination of hardware and/or software, FIG. 10 is a block diagram of one of the macro base stations 12 of FIG. 1 according to one embodiment of the present disclosure. Note that while the macro base stations 12 are discussed herein, the functionality of the macro base stations 12 described herein can be performed by any type of radio access node. As illustrated, the macro base station 12 includes a baseband unit 22 including a processor 24, memory 26, and a network interface 28 and a radio unit 30 including a transceiver 32 coupled to one or more antennas 34. In one embodiment, the functionality of the macro base station 12 described herein is implemented in software stored in the memory 26 and executed by the processor 24. Additionally, the macro base station 12 may include additional components responsible or providing additional functionality, including any of the functionality described above and/or any functionality necessary to support the embodiments described herein.

FIG. 11 is a functional block diagram of one of the macro base stations 12 of FIG. 1 according to one embodiment of the present disclosure. As illustrated, the macro base station 12 includes a ranging signal reception module 36, a range estimation module 38, and a base-station-to-base-station communication module 40, each of which is implemented in software executed by one or more processors (e.g., the processor 24 of FIG. 10). The ranging signal reception module 36 operates to receive a ranging signal transmitted by a wireless device 20. The range estimation module 38 then determines, or generates, a range estimate for a range between the wireless device 20 and the macro base station 12 based on the ranging signal. The base-station-to-base-station communication module 40 operates to send information, e.g., ranging assistance information, to low-power base stations 16 of interest, as discussed above.

While the low-power base stations 16 (or any type of radio access nodes in the supporting layer) may be implemented in hardware or any combination of hardware and/or software, FIG. 12 is a block diagram of one of the low-power base stations 16 of FIG. 1 according to one embodiment of the present disclosure. Note that while the low-power base stations 16 are discussed herein, the functionality of the low-power base stations 16 described herein can be performed by any type of radio access node. As illustrated, the low-power base station 16 includes a baseband unit 42 including a processor 44, memory 46, and a network interface 48 and a radio unit 50 including a transceiver 52 coupled to one or more antennas 54. In one embodiment, the functionality of the low-power base station 16 described herein is implemented in software stored in the memory 46 and executed by the processor 44. Additionally, the low-power base station 16 may include additional components responsible for providing additional functionality, including any of the functionality described above and/or any functionality necessary to support the embodiments described herein.

In one embodiment, a computer program including instructions which, when executed by at least one processor, cause the at least one processor to carry out the functionality of a radio access node according to any one of the embodiments described herein is provided. In one embodiment, a carrier containing the aforementioned computer program product is provided. The carrier is one of an electronic signal, an optical signal, a radio signal, or a computer-readable storage medium (e.g., a non-transitory computer-readable medium such as the memory 26, 46).

FIG. 13 is a functional block diagram of one of the low-power base stations 16 of FIG. 1 according to one embodiment of the present disclosure. As illustrated, the low-power base station 16 includes passive range estimation module 56, a state selection module 58, and a base-station-to-base-station communication module 59, each of which is implemented in software executed by one or more processors (e.g., the processor 44 of FIG. 12). The passive range estimation module 56 operates passively to detect the proximity of a wireless device 20 to the low-power base station 16 (e.g., determine a range estimate of the range between the low-power base station 16 and a wireless device 20 from whom the low-power base station 16 passively detected a ranging signal when operating in the light sleep state). The state selection module 58 operates to select a state for the low-power base station 16 based on the range estimate from the passive range estimation module 56 (e.g., decide whether to transition to an active state from the light sleep state). The base-station-to-base-station communication module 59 operates to, e.g., enable reception of ranging assistance information and, in some embodiments, additional information from an anchor node of the wireless device 20.

While the wireless devices 20 may be implemented in any type of hardware or any combination of hardware and software, FIG. 14 is a block diagram of one of the wireless devices 20 of FIG. 1 according to one embodiment of the present disclosure. As illustrated, the wireless device 20 includes a processor 60, memory 62, and a transceiver 64 coupled to one or more antennas 66. In particular embodiments, some or all of the functionality described above as being provided by the wireless device 20 may be provided by the processor 60 executing instructions stored on a computer-readable medium, such as the memory 62. Alternative embodiments of the wireless device 20 may include additional components responsible for providing additional functionality, including any of the functionality identified above and/or any functionality necessary to support the embodiments described above.

In one embodiment, a computer program including instructions which, when executed by at least one processor, cause the at least one processor to carry out the functionality of a wireless device 20 according to any one of the embodiments described herein is provided. In one embodiment, a carrier containing the aforementioned computer program product is provided. The carrier is one of an electronic signal, an optical signal, a radio signal, or a computer-readable storage medium (e.g., a non-transitory computer-readable medium such as the memory 62).

FIG. 15 is a functional block diagram of one of the wireless devices 20 of FIG. 1 according to one embodiment of the present disclosure. As illustrated, the wireless device 20 includes a ranging signal transmission module 68 that operates to transmit a ranging signal such as, for example, a RACH signal or an uplink SRS.

Embodiments disclosed herein may be implemented to provide numerous advantages. While the embodiments disclosed herein are not limited by or to any particular advantage, a number of examples are provided below. As one example, use of ranging information as disclosed herein allows selective activation of the low-power base stations 16 and is particularly important in an environment with a dense packing of low-power base stations 16 in the supporting layer. Furthermore, some embodiments disclosed herein may be utilized in a complementary fashion with IoT measurements.

Embodiments disclosed herein provide the opportunity for significant energy savings in the base station portions of the RAN through tailored activation of base stations in the supporting layer as required. At least some of the embodiments disclosed herein are backwards compatible with all versions of LTE UE releases and only optionally impact the X2 interface content.

The following acronyms are used throughout this disclosure.

3GPP 3rd Generation Partnership Project
CID Cell Identifier
C-RNTI Cell Radio Network Temporary Identity
eNB Enhanced Node B
IoT Interference over Thermal
LTE Long Term Evolution
ms Millisecond
OAM Operations, Administration, Maintenance
OPEX Operational Expenditures
PDCCH Physical Downlink Control Channel
PUCCH Physical Uplink Control Channel
PUSCH Physical Uplink Shared Channel
RACH Random Access Channel
RAN Radio Access Network
RF Radio Frequency
SRS Sounding Reference Signal
UE User Equipment
UL SRS Uplink Sounding Reference Signal
UTDOA Uplink Time Difference of Arrival
WD Wireless Device Those skilled in the art will recognize improvements and modifications to the embodiments of the present disclosure. All such improvements and modifications are considered within the scope of the concepts disclosed herein and the claims that follow.

What is claimed is:

1. A method of operation of a supporting radio access node in a cellular communications network comprising one or more coverage radio access nodes in a coverage layer and one or more supporting radio access nodes in a supporting layer, the method comprising:
   detecting a ranging signal transmitted by a wireless device while passively listening for ranging signals from nearby wireless devices;
   receiving ranging assistance information from an anchor radio access node of the wireless device, wherein the anchor radio access node is in the coverage layer;
   determining a first range estimate for a range between the wireless device that transmitted the ranging signal and the supporting radio access node, wherein the first range estimate is determined based on:
      the ranging signal transmitted by the wireless device and detected by the supporting radio access node, and
      the ranging assistance information received from the anchor radio access node of the wireless device;
   deciding to enter an active state based on the first range estimate, wherein said deciding to enter the active state comprises deciding to enter the active state if one or more activation criteria are satisfied, and wherein the one or more activation criteria comprise a criterion that the first range estimate satisfies a predefined range threshold for the first range estimate;
   entering the active state in response to deciding to enter the active state, wherein the active state is a dynamically active state; and
   after entering the active state, autonomously deciding to transition back to a light sleep state in which the supporting radio access node passively listens for ranging signals from nearby wireless devices, wherein the transitioning back to the light sleep state is decided when there are no wireless devices within a threshold proximity of the supporting radio access node.

2. The method of claim 1, wherein the one or more activation criteria further comprise a criterion based on a received power of the ranging signal.

3. The method of claim 1, wherein the cellular communications network is a synchronous cellular communications network.

4. The method of claim 3, wherein the ranging assistance information comprises a second range estimate for a range between the wireless device that transmitted the ranging signal and the anchor radio access node.

5. The method of claim 3, wherein the ranging assistance information comprises fully or partially processed data received from the anchor radio access node.

6. The method of claim 3 further comprising:
   receiving additional information from the anchor radio access node; and
   deciding whether to enter the active state based on the first range estimate and the additional information.

7. The method of claim 3 further comprising:
   determining whether a more accurate range estimate, for the range between the wireless device that transmitted the ranging signal and the supporting radio access node, is needed; and
   obtaining the more accurate range estimate, for the range between the wireless device that transmitted the ranging signal and the supporting radio access node, if the more accurate range estimate is needed.

8. The method of claim 3 further comprising:
   determining whether a more accurate range estimate, for the range between the wireless device that transmitted the ranging signal and the supporting radio access node, is needed; and
   if the more accurate range estimate is needed:
      obtaining the more accurate range estimate, for the range between the wireless device that transmitted the ranging signal and the supporting radio access node; and
      deciding to enter the active state if the more accurate range estimate satisfies a predefined range threshold for the more accurate range estimate.

9. The method of claim 3 further comprising, prior to determining the first range estimate:
   determining a rough range estimate, for the range between the wireless device that transmitted the ranging signal and the supporting radio access node, based on the ranging signal transmitted by the wireless device and detected by the supporting radio access node;
   determining whether the rough range estimate satisfies a predefined rough range criterion; and
   deciding to not enter the active state if the rough range estimate does not satisfy the predefined rough range criterion.

10. The method of claim 3, wherein the ranging signal transmitted by the wireless device is a Random Access Channel (RACH), and wherein the method further comprises, prior to determining the first range estimate:
   determining a rough range estimate, for the range between the wireless device that transmitted the ranging signal and the supporting radio access node, based on the ranging signal transmitted by the wireless device and detected by the supporting radio access node;
   determining whether the rough range estimate satisfies a predefined rough range criterion; and
   remaining in the light sleep state during which the supporting radio access node passively listens for ranging signals from nearby wireless devices, if the rough range estimate does not satisfy the predefined rough range criterion.

11. The method of claim 10 further comprising:
determining whether correlated RACH information has been received from the anchor radio access node for the wireless device that transmitted the RACH,
wherein said determining the first range estimate comprises determining the first range estimate if the correlated RACH information has been received from the anchor radio access node of the wireless device.

12. The method of claim 11 further comprising:
if the correlated RACH information has not been received, remaining in the light sleep state.

13. The method of claim 11, wherein:
the correlated RACH information comprises the ranging assistance information; and
determining the first range estimate, if the correlated RACH information has been received from the anchor radio access node of the wireless device, comprises determining the first range estimate based on:
  the RACH transmitted by the wireless device and detected by the supporting radio access node, and
  the ranging assistance information comprised in the correlated RACH information received from the anchor radio access node.

14. The method of claim 13, wherein the ranging assistance information comprises a second range estimate for a range between the wireless device that transmitted the RACH and the anchor radio access node.

15. The method of claim 13, wherein the correlated RACH information further comprises a received power of the RACH at the anchor radio access node of the wireless device, and the method further comprises:
determining whether the first range estimate satisfies the predefined range threshold for the first range estimate; and
determining whether a ratio of a received power of the RACH at the supporting radio access node and the received power of the RACH at the anchor radio access node satisfies a predefined criterion.

16. The method of claim 15 further comprising:
determining whether a more accurate range estimate, for the range between the wireless device that transmitted the ranging signal and the supporting radio access node, is needed; and
if the more accurate range estimate is needed:
  obtaining the more accurate range estimate of the range between the wireless device that transmitted the ranging signal and the supporting radio access node; and
  deciding to enter the active state if the more accurate range estimate satisfies a predefined range threshold for the more accurate range estimate and the ratio of the received power of the RACH at the supporting radio access node and the received power of the RACH at the anchor radio access node satisfies the predefined criterion.

17. The method of claim 16, wherein said obtaining the more accurate range estimate comprises obtaining the more accurate range estimate based on an uplink sounding reference signal transmitted by the wireless device.

18. The method of claim 1, wherein the ranging signal is a Random Access Channel (RACH) transmitted by the wireless device.

19. The method of claim 1, wherein the ranging signal is an uplink sounding reference signal transmitted by the wireless device.

20. The method of claim 1, wherein said detecting the ranging signal transmitted by the wireless device comprises detecting the ranging signal transmitted by the wireless device while passively listening for a signal from a set of signals from which ranging information can be extracted.

21. A supporting radio access node in a cellular communications network comprising a plurality of coverage radio access nodes forming a coverage layer and a plurality of supporting radio access nodes forming a supporting layer, the supporting radio access node comprising:
a transceiver;
a processor; and
a memory containing instructions that are executable by the processor whereby the supporting radio access node is operative to:
  detect a ranging signal transmitted by a wireless device while passively listening for ranging signals from nearby wireless devices;
  receive ranging assistance information from an anchor radio access node of the wireless device, wherein the anchor radio access node is in the coverage layer;
  determine a first range estimate for a range between the wireless device that transmitted the ranging signal and the supporting radio access node, wherein the first range estimate is determined based on:
    the ranging signal transmitted by the wireless device and detected by the supporting radio access node, and
    the ranging assistance information received from the anchor radio access node of the wireless device;
  decide to enter an active state based on the first range estimate, wherein the supporting radio access node is operative to decide to enter the active state by deciding to enter the active state if one or more activation criteria are satisfied, and wherein the one or more activation criteria comprise a criterion that the first range estimate satisfies a predefined range threshold for the first range estimate;
  enter the active state in response to deciding to enter the active state, wherein the active state is a dynamically active state; and
  after entering the active state, autonomously decide to transition back to a light sleep state in which the supporting radio access node passively listens for ranging signals from nearby wireless devices, wherein the transitioning back to the light sleep state is decided when there are no wireless devices within a threshold proximity of the supporting radio access node.

* * * * *